United States Patent Office.

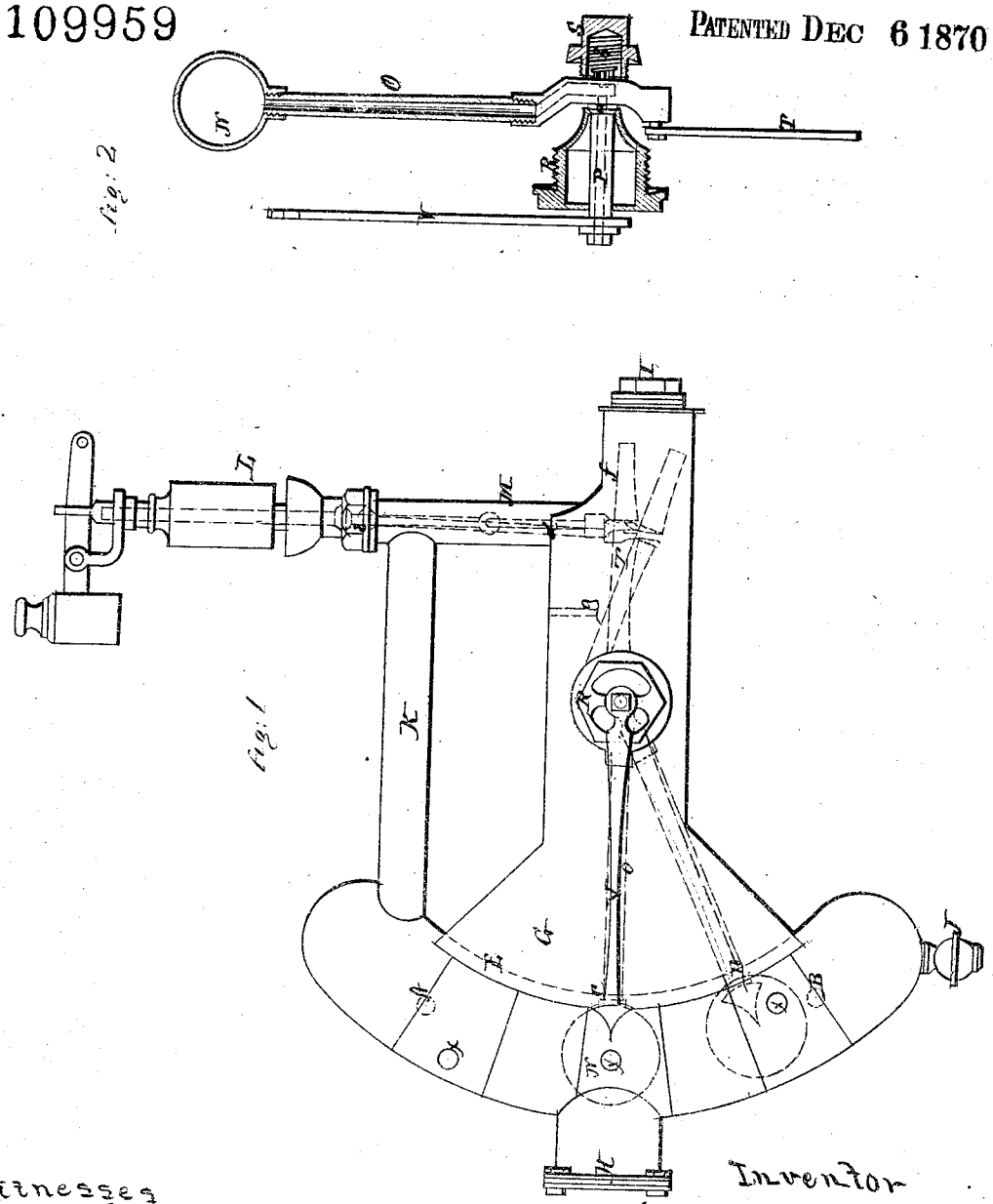

LEVI F. SMITH, OF PHILADELPHIA, PENNSYLVANIA.

Letters Patent No. 109,959, dated December 6, 1870.

IMPROVEMENT IN COMBINED HIGH AND LOW-WATER INDICATORS.

The Schedule referred to in these Letters Patent and making part of the same.

*To all whom it may concern:*

Be it known that I, LEVI F. SMITH, of Philadelphia, in the county of Philadelphia and in the State of Pennsylvania, have invented certain new and useful Improvements in Combined Low and High-Water Indicator, Water-Gauge, and Call-Whistle; and do hereby declare that the following is a full, clear, and exact description thereof, reference being had to the accompanying drawing and to the letters of reference marked thereon making a part of this specification.

The nature of my invention consists in an improvement in "low and high-water indicators" for steam-generators of any description, as will be hereinafter fully set forth.

In order to enable others skilled in the art to which my invention appertains to make and use the same, I will now proceed to describe its construction and operation, referring to the annexed drawing, in which—

Figure 1 is a side view of my machine, and

Figure 2 is a horizontal section showing the float and its attachments.

G represents the shell or casing of my machine, constructed as shown in fig. 1, one end being rounded and nearly semicircular, and having in its center an opening, H, suitably closed by a cap and rubber packing for the insertion of the float.

At the opposite end of the casing is a screw, I, which can be readily taken out for the purpose of cleaning out the casing when necessary.

At the under side of the rounded semicircular end of the casing is a petcock, J, for the purpose of blowing out any sediment that may collect in this part of the casing.

From the upper portion of this rounded end of the casing a pipe, K, leads to a whistle, L, placed upon a tube, M, near the other end of the casing.

In the semicircular part of the casing G is placed a hollow ball or float, N, provided with a hollow arm, O, which extends through the center of the casing, and bent as shown in fig. 2.

From this bent portion of the arm O a hollow tube, P, extends, at right angles, through the front side of the casing forming the journal, upon which the arm O turns.

In the front side of the casing is inserted a nut, R, which is hollowed out, as shown in fig. 2, and the journal P passes through the center of said nut. It will be seen that this journal has two bearings in the nut R, and at the same time the least possible amount of friction is created as the nut is hollowed out, as shown.

Upon the inner end of the journal P is formed a conical bearing, *a*, which is pressed toward its seat or box in the inner end of the nut R by means of a spiral spring, *b*, on the rear side of the bent portion of the arm O, said spring being held in place by a screw, S, through the rear side of the casing.

The inner end of the spring *b* is, as shown, inserted in a hole or recess formed on the arm O, whereby very little or no friction is caused.

To the rear end of the arm O is pivoted a lever, T, which is also suspended from a rod, *d*, connected with the valve *e* in the whistle L.

The casing G is attached to a steam-generator, and forms connection at A with the steam-space and at B with the water-space of the generator, said connections being so arranged that the point A will be above the high-water point and B below the low-water point.

C, being supposed the economical point, or about the height to which the water should be carried, the float N will then be in such a position with the arm T that the valve *e* of the whistle will be closed.

On the outer end of the journal is an indicator, V, which shows the state of the water in the boiler.

When the water rises the float N, of course, rises with it, and turns the arm T so that when the indicator shows the high-water point E, the rear end of the arm will strike a point, *f*, within the casing, which point thus forms a new fulcrum for said arm, so that the valve *e* in the whistle will be opened, and thus notify the engineer. In the same manner, when the water falls to the low-water point D, the inner end of the arm T will strike another point, *g*, within the casing, which also causes the whistle-valve to open.

It will be seen from the above that, as long as the water in the boiler is about the proper height, the whistle-valve is closed, but when it rises or falls to the high or low-water points the whistle will sound at once.

These points may be adjusted or changed at will, by merely adjusting the connection between the arm or lever T and the rod *d*.

A cord may be attached to the lever of the whistle-valve so that it may be used at any time as a common call-whistle.

Gauge-cocks *x x x* are attached to the semicircular part of the casing G, so that, in addition to the indicator, the state of the water may be readily ascertained at any time by means of said cocks. These cocks are not placed directly above each other, but more to one side, so that the water will not drop from one onto the other.

The hollow nut R, as well as the screws I and S, are hollowed out or recessed on the under or inner side, for the insertion of suitable packing to make steam-tight joints. By this means it will not be necessary to make the screw-threads so very tight, as this is always inconvenient on account of the trouble to unscrew the same. The packing on the outside of the screw-seat renders the joint perfectly steam-tight, and at the same time can be readily removed.

Having thus fully described my invention,

What I claim as new, and desire to secure by Letters Patent, is—

1. In combination with the hollow casing G, the float N, hollow arm O, hollow journal P, indicator V, lever T, fulcrums $f$ $g$, and whistle-valve $e$, all constructed to operate substantially as set forth.

2. The fulcrums $f$ and $g$, arranged within the casing G, and operating with the lever T, substantially as and for the purposes herein set forth.

3. In combination with the casing G, float N, arm O, journal P, and indicator V, lever T and fulcrum $f$ $g$, the nut R, valve $a$, nut S, and spring $b$, all constructed to operate substantially as set forth.

In testimony that I claim the foregoing, I have hereunto set my hand this 4th day of June, 1870.

LEVI F. SMITH.

Witnesses:
C. L. EVERT,
A. N. MARR.